United States Patent
Oe et al.

(10) Patent No.: US 7,693,547 B2
(45) Date of Patent: Apr. 6, 2010

(54) MOBILE COMMUNICATION TERMINAL, AND CORE MODULE AND FUNCTION MODULE FOR MOBILE COMMUNICATION TERMINAL

(75) Inventors: Yutaka Oe, Tokyo (JP); Nobuyuki Enomoto, Kyoto (JP); Fuji Asada, Kyoto (JP); Shigetaka Kanai, Kyoto (JP)

(73) Assignee: Vodafone Group PLC, Newbury, Berkshire (GB)

( * ) Notice: Subject to any disclaimer, the term of this patent is extended or adjusted under 35 U.S.C. 154(b) by 0 days.

(21) Appl. No.: 11/359,873

(22) Filed: Feb. 23, 2006

(65) Prior Publication Data
US 2006/0198601 A1 Sep. 7, 2006

Related U.S. Application Data

(63) Continuation of application No. PCT/JP2004/016105, filed on Oct. 29, 2004.

(30) Foreign Application Priority Data

Oct. 30, 2003 (JP) ............................. 2003-370658

(51) Int. Cl.
*H04B 1/38* (2006.01)
*H04B 1/08* (2006.01)

(52) U.S. Cl. ...................................... 455/557; 455/349

(58) Field of Classification Search ................. 455/418, 455/419, 557, 558, 349, 90.3, 344, 347, 348
See application file for complete search history.

(56) References Cited

U.S. PATENT DOCUMENTS

| | | | |
|---|---|---|---|
| 6,477,357 B1 * | 11/2002 | Cook | 455/90.1 |
| 7,050,783 B2 * | 5/2006 | Curtiss et al. | 455/404.1 |
| 2004/0192274 A1 * | 9/2004 | Vuori | 455/418 |

FOREIGN PATENT DOCUMENTS

| | | |
|---|---|---|
| JP | 11-155001 | 6/1999 |
| JP | 2003-32381 | 1/2003 |

* cited by examiner

*Primary Examiner*—Quochien B Vuong
(74) *Attorney, Agent, or Firm*—Kratz, Quintos & Hanson, LLP

(57) ABSTRACT

A mobile communication terminal 10 is assembled by a user incorporating an arbitrary desired function module 31, 32, 33 into a core module 20. When assembling the terminal, it is not possible for the core module 20 to know what type of function module is being incorporated in advance, but it is possible to ascertain the type of function module that has been incorporated by using identification information notified to the connection module control means of the core module 20 via the core module communication processing section of the function module 31, 32, 33 and the inter-module communication processing section of the core module 20. The core module 20 therefore implements a function appropriate to the users needs by appropriately controlling that function module. Therefore, it is possible to make effective use of resources, as well as reducing the burden placed on a user when upgrading or adding functions, to meet the diverse needs of the user.

12 Claims, 13 Drawing Sheets

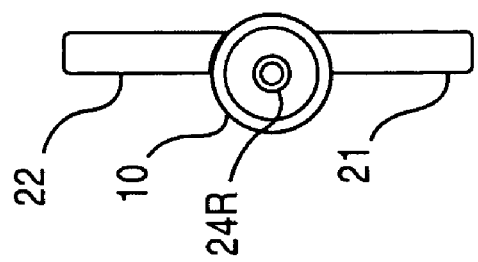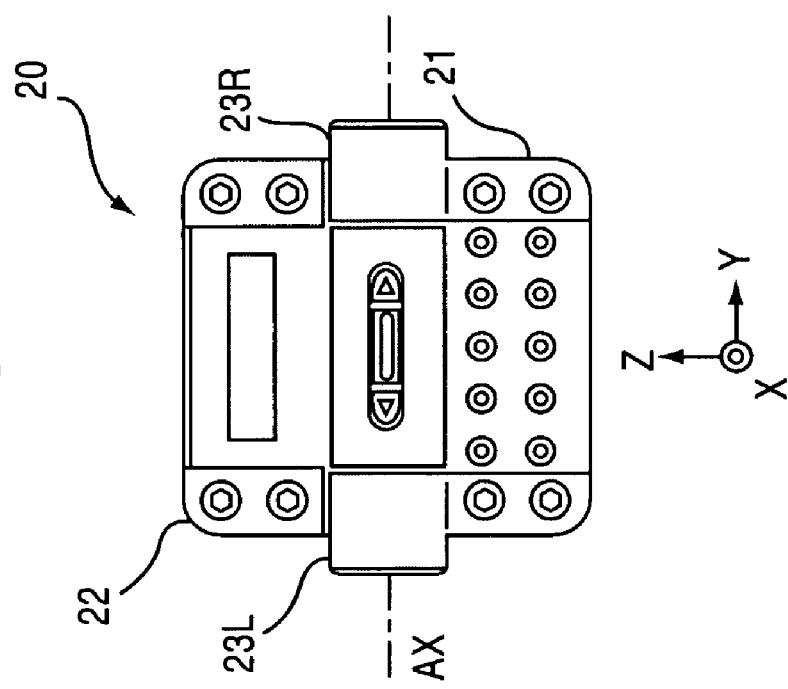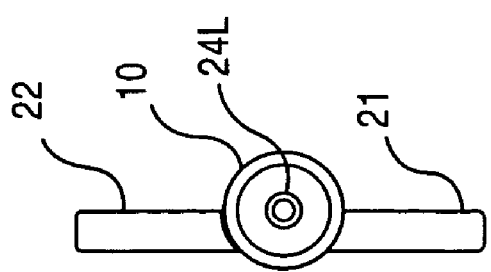

Fig.3A
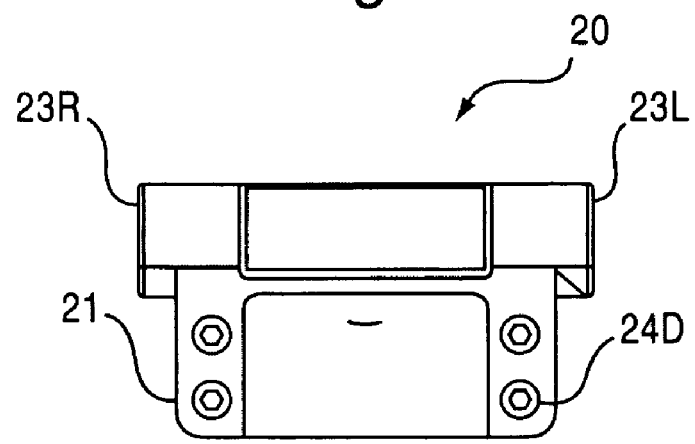
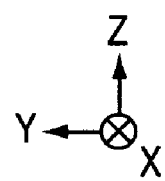
Fig.3B
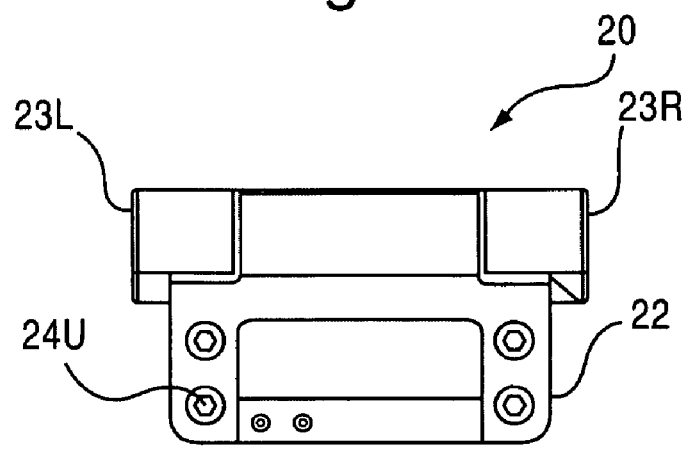
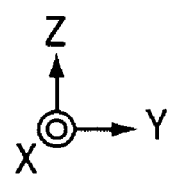

MOBILE COMMUNICATION TERMINAL, AND CORE MODULE AND FUNCTION MODULE FOR MOBILE COMMUNICATION TERMINAL

RELATED APPLICATION

This is a continuation application of the international patent application No. PCT/JP2004/016105 filed with Application date Oct. 29, 2004.

BACKGROUND OF THE INVENTION

The present invention relates to a mobile communication terminal, and to a core module and function module for a mobile communication terminal, and in more detail, relates to a mobile communication terminal, having a core module and a plurality of function modules connected in a detachable manner, for carrying out wireless communication between base stations of a mobile communication network, and to the core module and function module that are components of the mobile communication terminal.

BACKGROUND ART

Mobile communication terminals such as cellular phones have become widespread in recent years. Such mobile communication terminals generally have an e-mail function (create e-mail, transceive e-mail, display content of received e-mail, etc.) and a browsing function, in addition to voice communication functions.

Also, in a mobile communication terminal, a user of games created by using an object oriented language (such as JAVA™) or music applications or the like, enjoys performing downloads and the like from a server via a base station. Another recent introduction has been a camera function built in to the mobile communication terminal.

In response to these various functions, providers of portable communication terminals have been preparing models incorporating many of these functions to meet the needs of users.

SUMMARY OF THE INVENTION

Problems to be Solved by the Invention

As has been described above, with a conventional portable communication terminal, the functions that can be used vary according the model made available by the provider. Such models are provided from the point of view of satisfying the most common requirements, and it is difficult for them to perfectly meet the diverse needs of users.

There have also been remarkable advances in the technology relating to portable communication terminals, and new models incorporating the latest functions are continually being announced. In order to use such new functions, it is necessary for the user to purchase a new model of portable communication terminal, even if they are not dissatisfied with the current model of portable communication terminal they have been using thus far, apart from the new functions. There is therefore a lot for the user to do in order to use the new functions.

If a new model is purchased, the user has no choice but to dispose of the portable communication device they have been using up to now, even if they are not dissatisfied with the current model, apart from the new functions. Therefore, regardless of whether or not there are parts that can still be made sufficient use of, it is not possible to make efficient use of those resources.

The present invention has been conceived with the above described problems in mind, and an object of the invention is to meet the various needs of users by providing a mobile communication terminal that makes effective use of sources, as well as reducing the burden placed on a user when upgrading or adding functions.

Means for Solving the Problem

A first aspect of the present invention is directed to a communication terminal, having a core module and a function module connected in an attachable and detachable manner, for performing wireless communication with base stations in a mobile communication network, the function module comprising: core module communication processing means, for transceiving data, including transmission of own module identity information, to and from the core module, the core module comprising wireless communication control means, for controlling the base station; a wireless transceive data processing section for carrying out transceiving data processing by using the wireless communication; inter module communication processing means, for transceiving data, including receipt of the module identity information, to and from the function module; and connection module control means for controlling the function module based on the identity information.

With this mobile communication terminal, it is possible to build a mobile communication terminal having the functions a user wants by having the user arbitrarily combine a desired function module with a core module. When building the terminal, it is not possible for the core module to know what type of function module is being incorporated in advance, but it is possible to ascertain the type of function module that has been incorporated by using module identification information notified to the connection module control means of the core module via the core module communication processing means of the function module and the inter module communication processing means of the core module. The core module therefore implements the function of appropriately controlling the function module according to the users needs.

Also, the construction of this mobile communication terminal is such that the core module and the function module may be easily attached or removed for connection. Therefore, in order to change to new functions or add functions, even if the existing core module or functional module is updated to a new core module or functional module, or a new function module is added, the only requirement is to purchase a new core module or function module.

Therefore, with the mobile communication terminal of the present invention, it is possible to make effective use of resources, as well as reducing the burden placed on a user when upgrading or adding functions.

With the mobile communication terminal of the present invention, the function module further comprises control information storage means for storing control information for self-control, and the core module further comprises control information download means for downloading new control information from control information storage means for storing the new control information in the event that it is decided, from the module identity information, to be necessary to download new control information, and control information install means for integrating the downloaded control information into the connection module control means.

In this case, the control information download means downloads control information that is stored in the control information storage means of that function module, when there is a function module that is not capable of being controlled by the core module because it does not have predetermined control information, among function modules fitted to the core module. Subsequently, the control information install means installs the downloaded control information into connection module control means. As a result, it is possible to automatically carry out control in an installation step by using the core module, even if the function module cannot be controlled by the core module, when it is fitted to the core module.

Herein, the control information may be a control program. In this case, new connection does not involve the need to install control programs for all anticipated function modules into the core module, or download a control program by users from another device via a network.

A second aspect of the present invention is directed to a core module for a mobile communication terminal that is capable of connecting a function module in an attachable and detachable manner, comprising wireless communication control means, for controlling wireless communications with the base stations of a mobile communication network; a wireless transceive data processing section for carrying out transceive data processing by using the wireless communication; inter-module communication processing means, for transceiving data, including receipt of module identity information for identifying the function module, to the function module; and connection module control means for controlling the function module based on the module identity information.

With this core module for a mobile communication terminal, when the user arbitrarily fits a desired function module into the core module, it is not possible to know what type of function module is being incorporated in advance. However, it is possible to ascertain what type of function module has been combined, by means of module identification information notified to the connection module control means via the inter module communication processing means. It is therefore possible for the core module for the mobile communication terminal to appropriately control the function module. As a result, it is possible to construct the above described mobile communication terminal of the present invention by using the core module for a mobile communication terminal of the present invention.

With the core module for a mobile communication terminal of the present invention, it is possible to have a structure further comprising control information download means for downloading the new control information from a function module storing the new control information in the event that it is decided from the module identity information to be necessary to download new control information, and the control information install means for integrating the control information, which is downloaded by using the control information download means, into the connection module control means.

In this case, among function modules fitted to the core module for the mobile communication terminal, even if there is a function module that is not capable of being controlled by a core module for the mobile communication terminal because predetermined control information is not given to the core module, the control information download means downloads control information that is stored in the control information storage means of that function module. The control information install means then installs the downloaded control information into connection module control means. As a result, it is possible to automatically carry out control in an installation step by using the core module for the mobile communication terminal, even if the function module can not be controlled by the core module for the mobile communication terminal, when it is fitted to the core module.

It is also possible for the core module for the mobile communication terminal of the present invention to be further provided with operation input means for carrying out operation input, and display output means for performing display output. In this case, minimum functions of the portable communication terminal, such as transceiving of e-mail via a communication network in response to instruction by the user, may be accomplished with only the core module for the mobile communication terminal.

A third aspect of the present invention is a function module for a mobile communication terminal that is capable of connecting to a core module for a mobile communication terminal in an attachable and detachable manner, comprising core module communication processing means for transceiving data, including transmission of own module identity information, to the core module for a mobile communication terminal.

With this function module for the mobile communication terminal, when it is combined into the core module for the mobile communication terminal, it is possible to transmit own-module identification information to the core module for the mobile communication terminal by using the core module communication processing means. Therefore, the core module for a mobile communication terminal may ascertain what type of function module for the mobile communication terminal has been incorporated by analyzing the module identification information, and it is possible to appropriately control the incorporated function module. As a result, it is possible to construct the above described mobile communication terminal of the present invention by using the function module for a mobile communication terminal of the present invention.

With the function module for a mobile communication terminal of the present invention, it is possible to have a structure where there is further provided control information storage means for storing control information that is exploited by core module for a mobile communication terminal, and the control information is transmitted via the core module communication processing means to the core module for a mobile communication terminal, when it is necessary to download new control information from the core module for a mobile communication terminal.

In this case, among function modules for a mobile communication terminal fitted to the core module for the mobile communication terminal, even if there is a function module for a mobile communication terminal that is not capable of being controlled by the core module for the mobile communication terminal because the predetermined control information is given to the core module, it is possible for the core module for a mobile communication terminal to automatically download and install the control information that is stored in the control information storage means of that function module for a mobile communication terminal. As a result, it is possible to automatically carry out control in the installation step by using the core module for the mobile communication terminal, even if the function module for a mobile communication terminal can not be controlled by the core module for the mobile communication terminal, when it is just fitted to the core module.

Effect of the Invention

As has been described above, the mobile communication terminal of the present invention is advantageous in that it is possible to make effective use of resources, as well as reducing the burden placed on a user when upgrading or adding functions.

Also, with the core module and function module for a mobile communication terminal of the present invention, there is the advantage that the mobile communication terminal of the present invention can be easily assembled.

BRIEF DESCRIPTION OF THE DRAWINGS

FIG. 2A shows the external structure of a right side of the core module of FIG. 1 in an opened up state;

FIG. 2B shows the external structure of the front of the core module of FIG. 1 in the opened up state;

FIG. 2C shows the external structure of the left of the core module of FIG. 1 in the opened up state;

FIG. 3A shows the external structure of the rear of the first part of FIG. 2B.

FIG. 3B shows the external structure of the rear of the second part of FIG. 2B;

DETAILED DESCRIPTION

One embodiment of the present invention will be described with reference to FIG. 1-FIG. 11.

Figure 1:
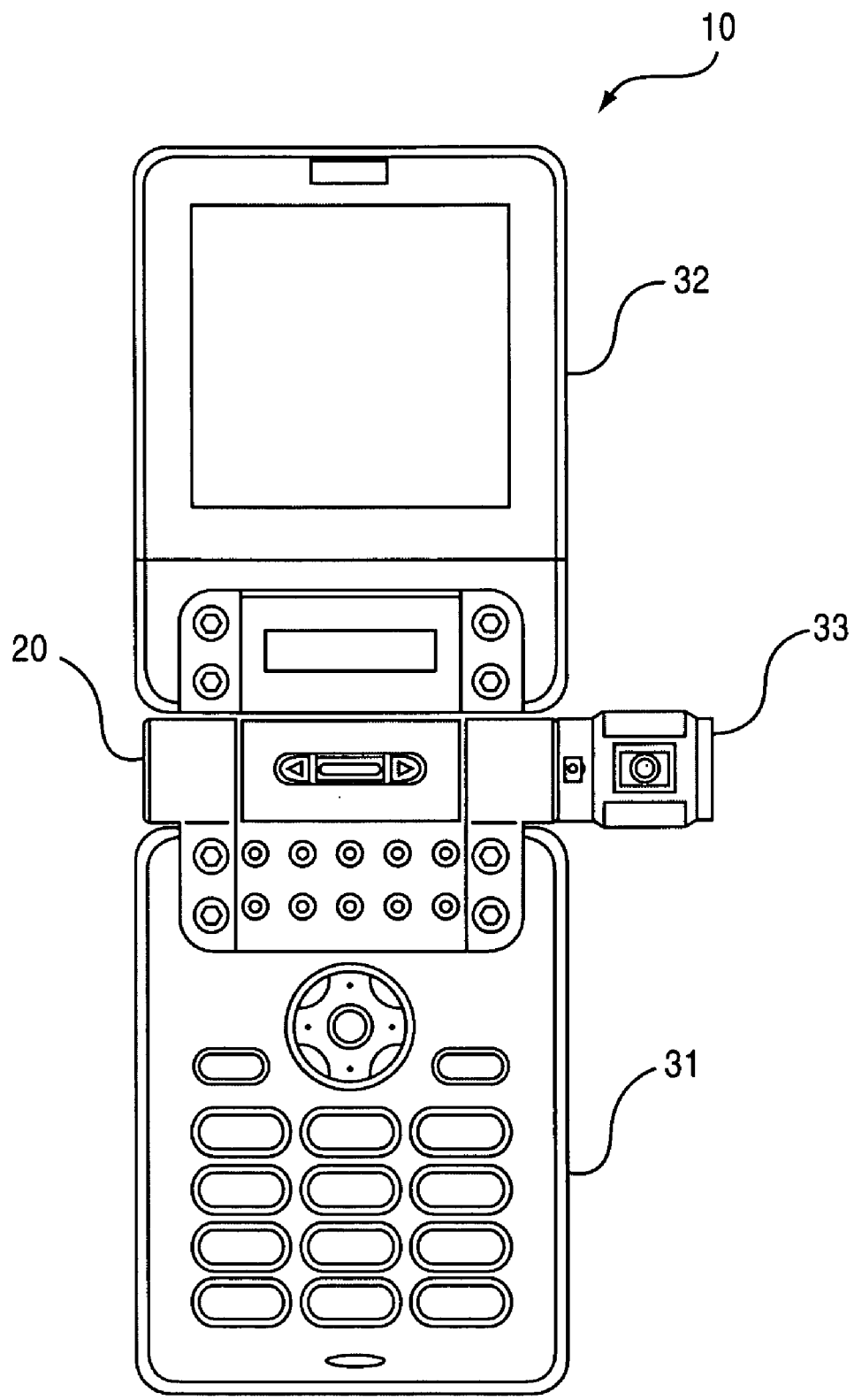
FIG. 1 shows the external structure of a mobile communication terminal of one embodiment of the present invention.

FIG. 1 shows the external structure of a mobile communication terminal 10 of one embodiment. As shown in FIG. 1, the mobile communication terminal 10 is a cellular phone having a camera function, and comprises a core module 20, and an operation section module 31, display module 32 and camera module 33 that are connected in a detachable and attachable manner to this core module 20.

The structure of the core module 20 is shown synthetically in FIG. 2A-FIG. 4. Here, the external structure of the core module 20 is shown in FIG. 2A-FIG. 3B, while the internal structure of the core module 20 is shown in the functional block diagram of FIG. 4.

As synthetically shown in a right view FIG. 2A, front view FIG. 2B and a left view FIG. 2C of the mobile communication terminal 10 in an opened state, the core module 20 comprises a first section 21, and a second section 22 that is connected to the first section in such a manner as to be rotatable about an axis AX. Here, the first section 21 is comprised of an operation section where operation input keys are laid out, a module connection section 23L having connection terminals 24L, and a module connection section 23R having connection terminals 24R. The module connection section 23L and the module connection section 23R have the same mechanical structure, and the connection terminal 24L and the connection terminal 24R have the similar shape. The second section 22 is provided with a display section for displaying characters, and so forth.

Note that small operation keys that are as small as possible while being capable of respectively being pressed down by a fingertip or the like are arranged on the operation section of the first section 21. A display device that is capable of displaying one or two lines is mounted on the display section of the second section 22.

A +X direction view of the second section 22 in a state of being folded on to the first section 21 is shown in FIG. 3A. As shown in FIG. 3A, terminals 24D for operation section module connection are arranged on the rear surface of the first section 21 in FIG. 2B. A −X direction view of the second section 22 in a state of being folded on to the first section 21 is shown in FIG. 3B. As shown in FIG. 3B, terminals 24U for display section module connection are arranged on the rear surface of the second section 22 in FIG. 2B.

Figure 4:
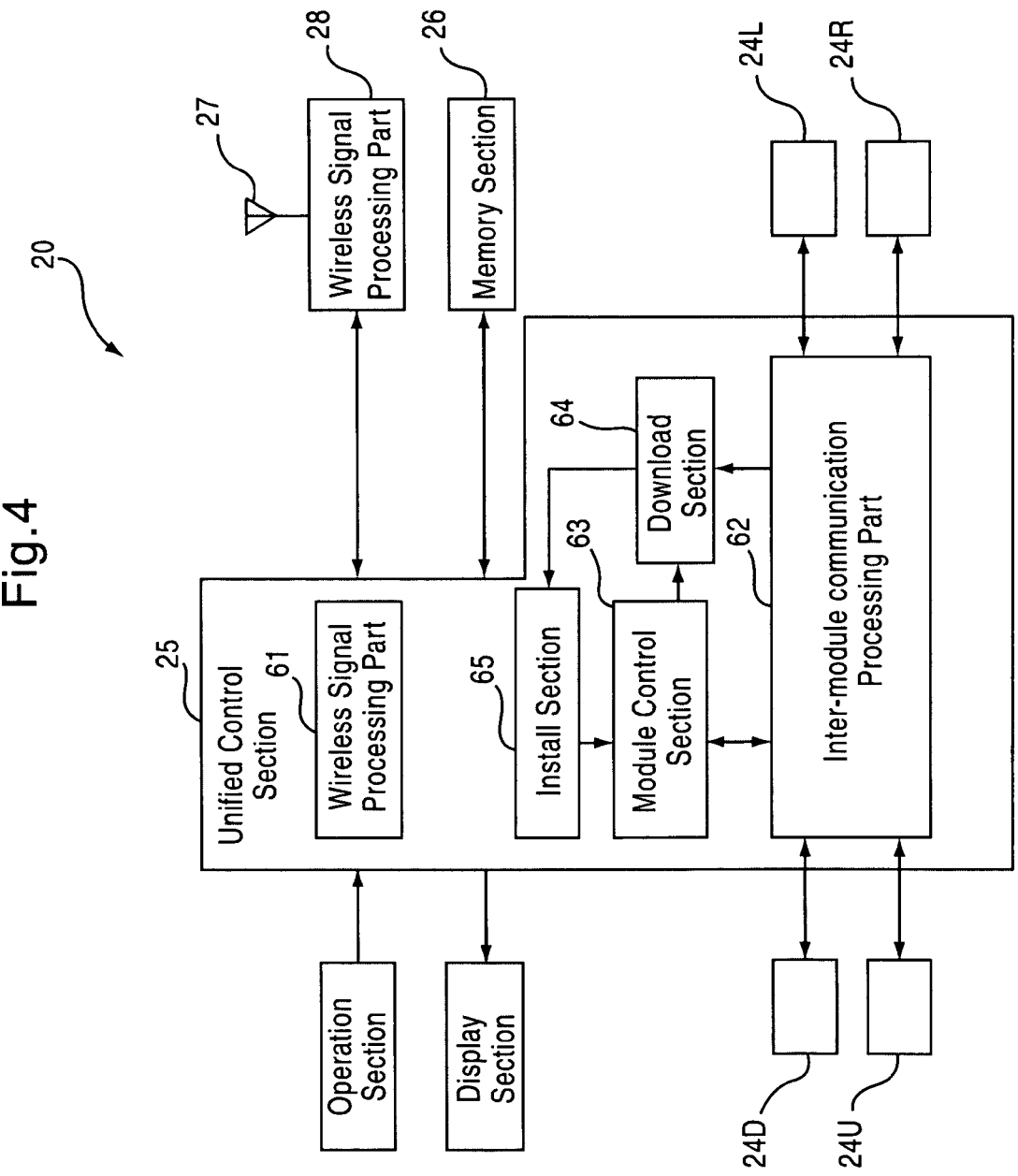
FIG. 4 is functional block diagram showing the internal structure of the left of the core module of FIG. 1.

As shown in FIG. 4, inside the core module 20 there are provided (a) a unified control section 25 for controlling the entire core module 20 and all kinds of modules connected to the core module 20, (b) a storage section 26 for storing programs and data for the unified control section 25, (c) an antenna 27 for carrying out transceiving of wireless signals between bases stations of a mobile communication network, and (d) a wireless signal processing section 28 for processing high frequency wireless signals being transceived.

The unified control section 25 comprises (i) a wireless communication control section 61, connected to the wireless signal processing section 28, for controlling wireless signals between base stations via the antenna 27 and the wireless signal processing section 28, (ii) an inter function module communication processing section 62, connected to the above described connection terminal 24L, connection terminal 24R, terminal for operations module connection 24D, and terminals for display module connection 24U, for processing signals respectively passed between the connected function modules 31, 32, 33, and (iii) a module control section 63 for respectively controlling connected function modules 31, 32, 33 (refer to FIG. 1), via the inter module communication processing section 62. The unified control section 25 comprises (iv) a download section 64 for downloading control information (including control programs) from connected function modules 31, 32, 33 via the inter module communication processing section 62, and (v) an install section 65 for incorporating control information acquired by the download section 64 into the module control section 63.

Note that the unified control section 25 is constructed comprising a central processing unit (CPU) and a digital signal processing unit (DSP), and can also realize functions of each of the above described sections 61-65 by using programs.

Figure 5A:
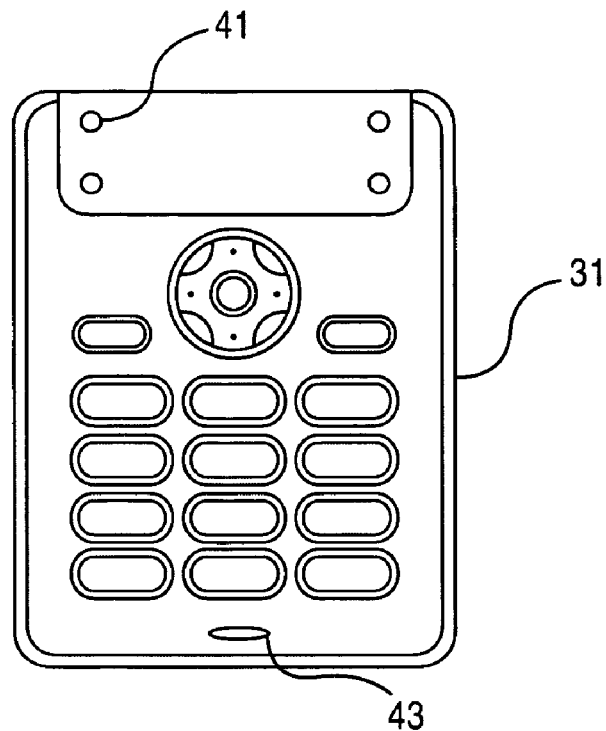
FIG. 5A shows the external structure of the first example of an operating section module.
Figure 5B:
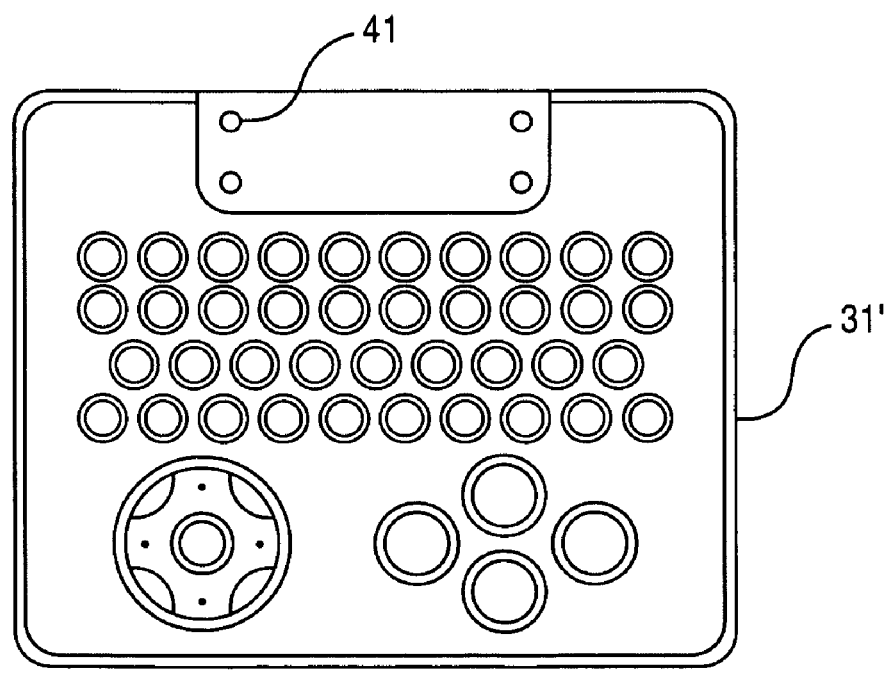
FIG. 5B shows the external structure of the second example of the operating section module.

As shown in FIG. 5A, the operation section module 31 is comprised of operation keys similarly arranged in the form of a numerical keypad, a connection terminal 41 for connection to the above described operation section module connection terminal 24D, and a microphone 43 for recording voice at the time of a voice communication. As shown in FIG. 5B, it is also possible to connect an operation module 31 to the core module 20 that as well as having an operation key layout that is the same as a full keyboard arrangement, is provided with the connection terminal 41 for connecting to the operation module connection terminal 24D, similar to the operation module 31.

Figure 6A:
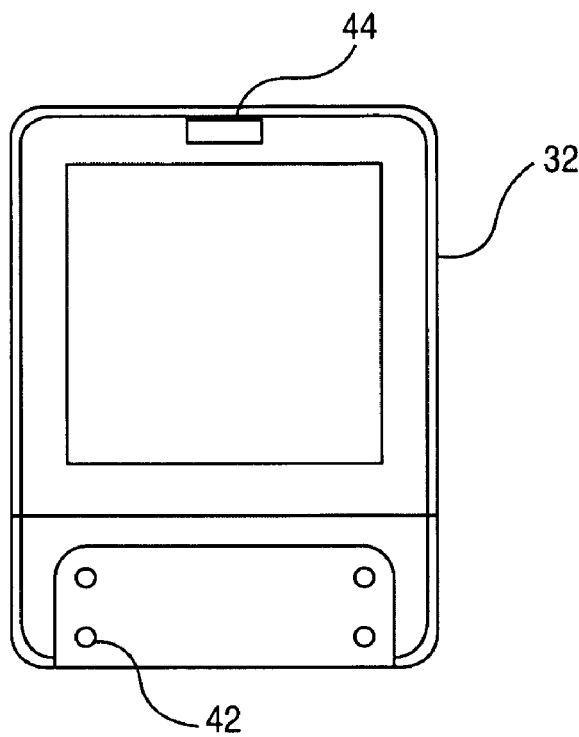
FIG. 6A shows the external structure of the first example of the display section module.
Figure 6B:
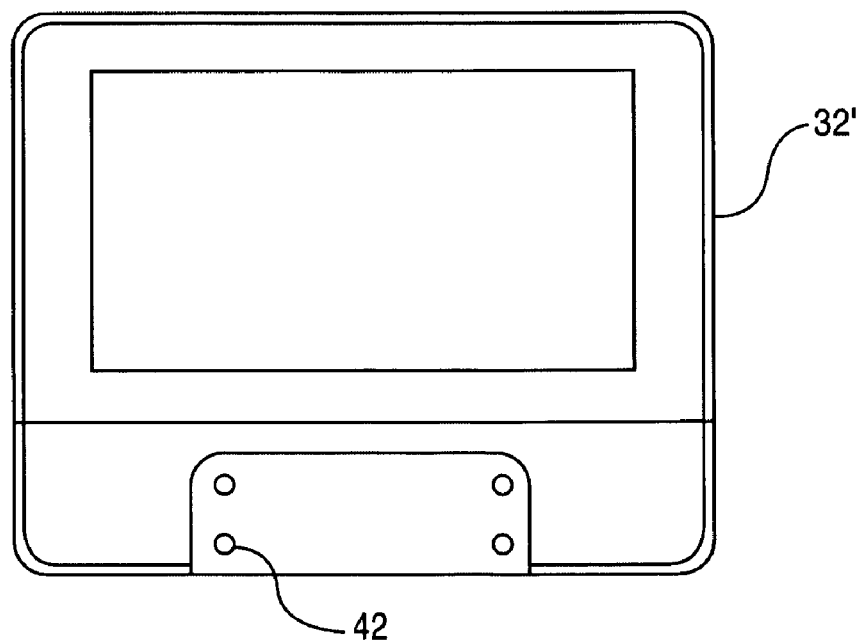
FIG. 6B shows the external structure of the second example of the display section module.

As shown in FIG. 6A, the display section module 32 comprises a main display for displaying characters and images during communication operation, a connection terminal 42 for connecting to the above described display section module connection terminal 24U, and a speaker for voice communication 44 for outputting voice at the time of a voice communication. Alternatively, the display section module 32 also has a subdisplay for display of characters and images during standby operation, and a guidance speaker for outputting guidance sounds such as a ringing tone, arranged on a rear surface side of FIG. 6A. As shown in FIG. 6B, it is also possible to connect a display module 32' to the core module 20 that, as well as having a large display arranged, is provided with the connection terminal 42 for connecting to the display section module connection terminal 24U, similar to the display section module 32.

Figure 7:
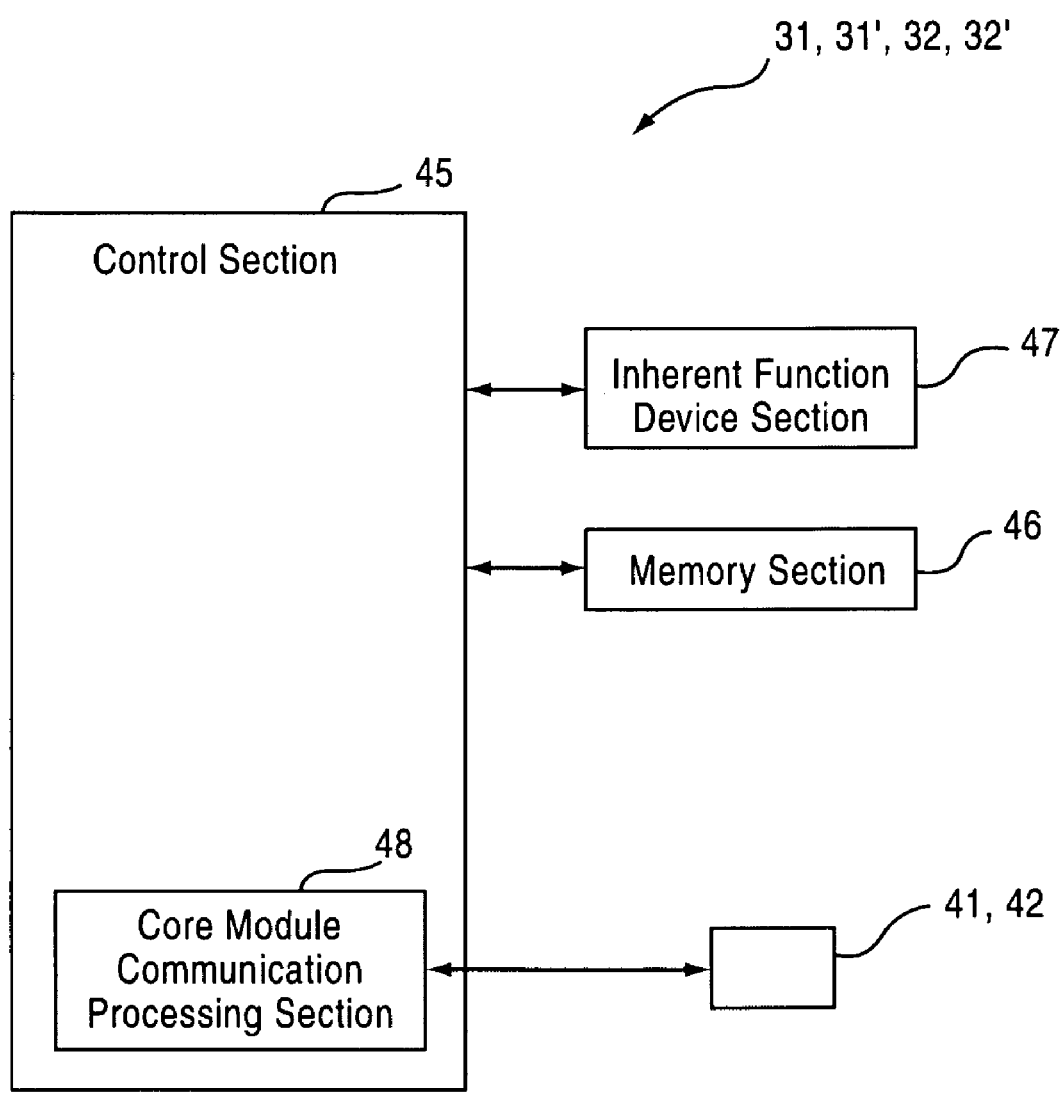
FIG. 7 is a functional block diagram showing the internal structure of the operating section module and the display section module.

As shown in FIG. 7, the operation section modules 31, 31' and the display section modules 32, 32' are respectively comprised internally of (a) a control section 45 for controlling operation of each function module, (b) a storage section 46 for storing programs for the control section 45, control information for the core module 20 to control each function module, various types of data and so forth, and (c) an inherent function device section 47 having devices corresponding to the function inherent to each function module. The control section 45 is provided with a core module communication processing section 48 for processing communication with the core module 20.

Note that the control section 45 is constructed comprising the central processing unit (CPU), and can also realize functions of the above described core module communication processing section 48 by using programs.

Figure 8C:
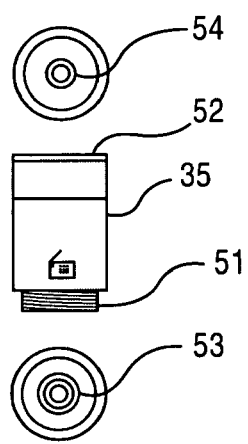
FIG. 8C shows the external structure of the radio tuner module.
Figure 8B:
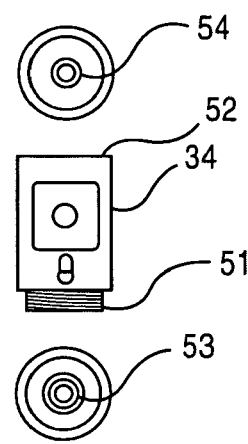
FIG. 8B shows the external structure of the flash lamp module.
Figure 8A:
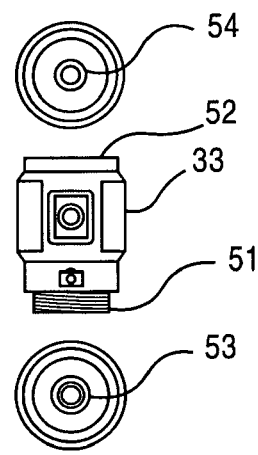
FIG. 8A shows the external structure of the camera module.
Figure 9C:
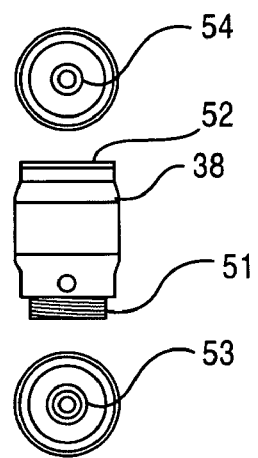
FIG. 9C shows the external structure of GPS module.
Figure 9B:
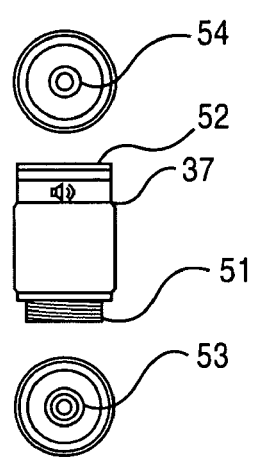
FIG. 9B shows the external structure of the speaker module.
Figure 9A:
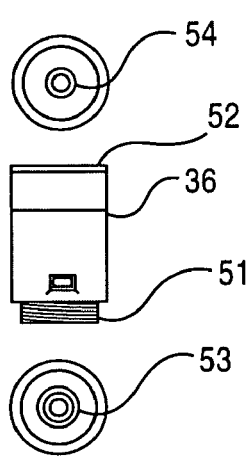
FIG. 9A shows the external structure of the television tuner module.

As shown in FIG. 8A, a camera module 33 comprises a connection section 51 having a mechanical structure that is capable of connecting to the module connection section 23L or the module connection section 23R of the core module 20, and a connection section 52 having a similar mechanical structure to the module connection section 23L and the connection module 23R. A connection terminal 53 that is capable of connection to the connection terminal 24L of the module connection section 23L or the connection terminal 24R of the module connection section 23R is provided in the connection section 51, and a connection terminal 54 having the same shape as the connection terminal 24L or the connection terminal 24R is provided in the connection section 52. It is also possible to connect the flash lamp module 34 of FIG. 8B, the radio tuner module 35 shown in FIG. 8C, the television tuner 36 shown in FIG. 9A, the speaker module 37 shown in FIG. 9B or the GPS (Global Positioning System) module 38 shown in FIG. 9C, each provided with the connection section 51 and the connection section 52, to the core module 20.

Figure 10:
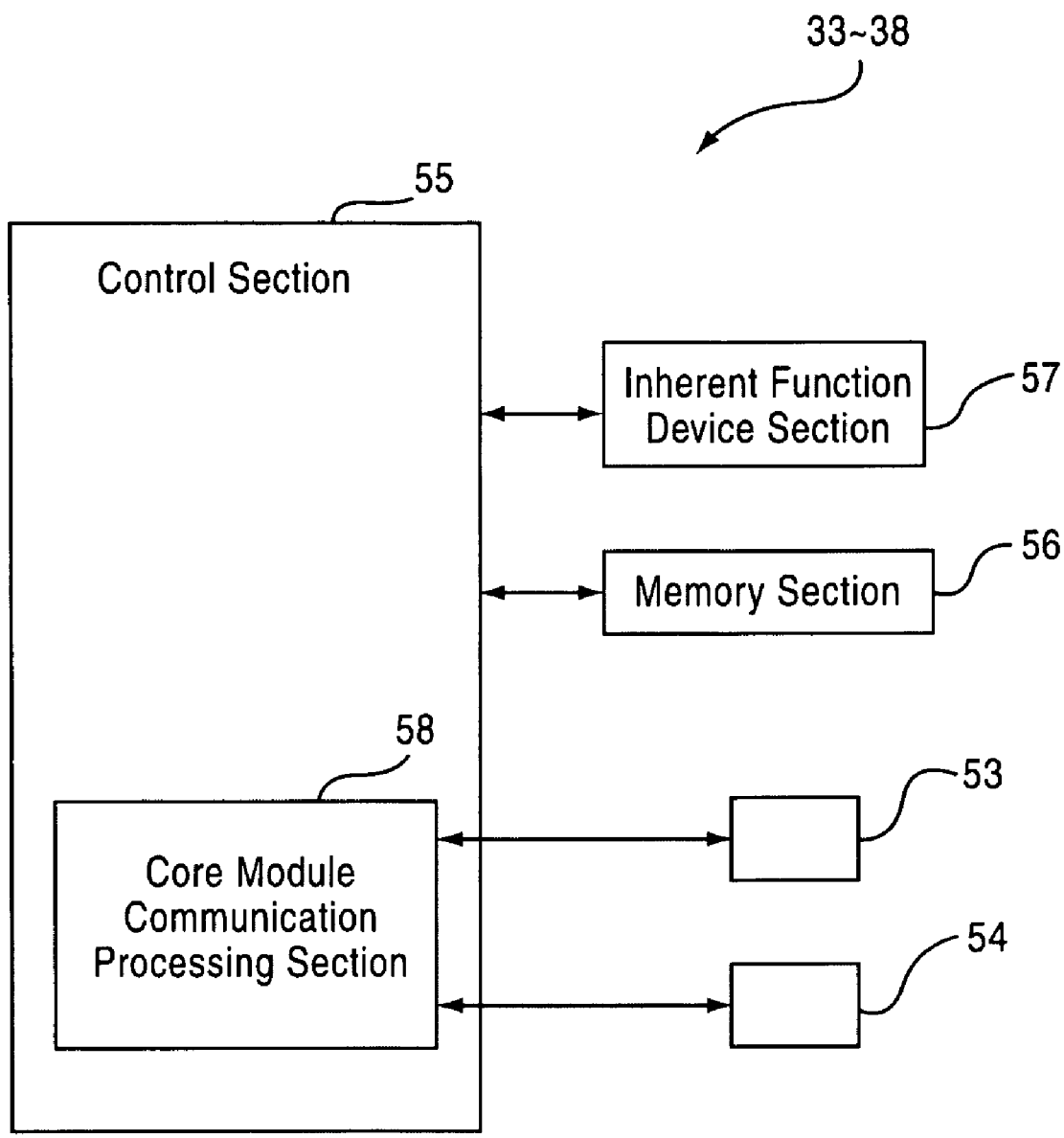
FIG. 10 is a functional block diagram showing the internal structure of each of the function modules of FIG. 8A to FIG. 9C.

As shown in FIG. 10, the respective function modules 33-38 comprised internally of (a) a control section 55 for control operation of each function module, (b) a storage section 56 for storing programs for the control section 55, control information for the core module 20 to control each function module, various types of data and so forth, and (c) an inherent function device section 57 having devices corresponding to the function inherent to each function module. The control section 55 is provided with a core module communication processing section 58, connected to the connection terminals 53, 54, for processing communication with the core module 20. Note that the core module communication processing section 58 is configured so that if a control code and data from the core module 20 input via the connection terminal 53 are not for its own module, the command and data are passed through to the connection terminal 54. Alternatively, the core module communication processing section 58 is configured so that if data and so forth is received via the connection terminal 54, the data or the like are passed through to the connection terminal 53.

Note that the control section 55 is constructed comprising a central processing unit (CPU), and can also realize functions of the above described core module communication processing section 58 by using programs.

Figure 11:
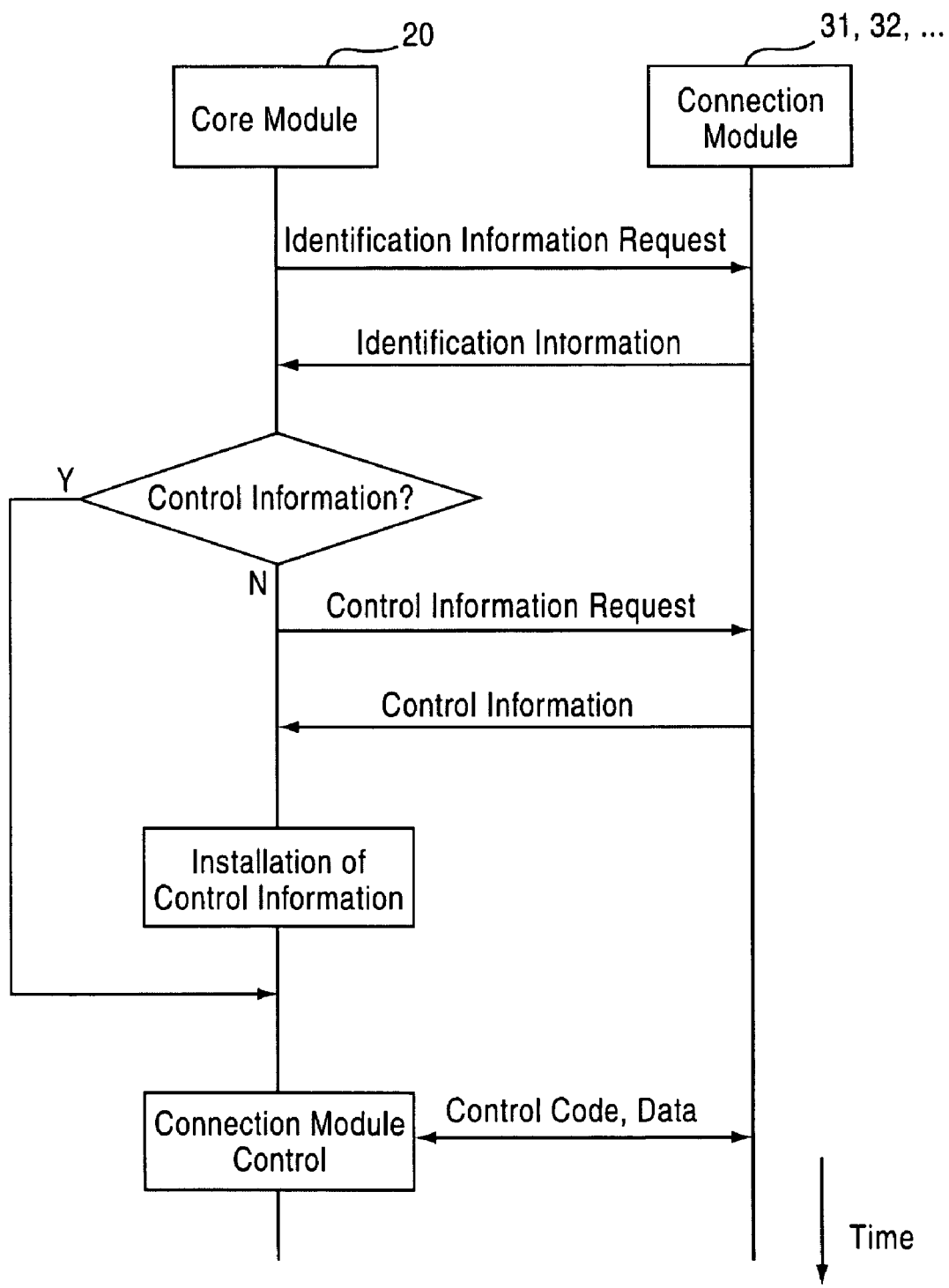
FIG. 11 is a sequence chart for describing acquisition of information for controlling a connected module by using a core module.

With the mobile communication terminal 10 constructed as described above, when an initialization instruction is executed as a result of power being turned on, as shown in FIG. 11, the module control section 63 of the core module 20 transmits, via the inter module communication processing section 62, an identification information request to each function module 31, 32, 33 in turn to request notification of identification information for identifying what type of function module each of the function modules 31, 32, 33 is. The control section 45 or control section 55 of each function module 31, 32, 33 that has received the identification information request at the core module communication processing section 48 or the core module communication processing section 58 then reads out identification information from the storage section 46 or storage section 56. The control section 45 or the control section 55 then transmits the identification information from the core module communication processing section 48 or the core module communication processing section 58 to the core module 20.

When the module control section 63 of the core module 20 receives identification information from each function module 31, 32, and 33, it is decided whether control information, such as a control program for a function module specified by the identification information, has already been incorporated, that is, whether or not it is installed. If the decision is negative, the module control section 63 requests download of control information to the download section 64. The download section 64 that has received this request transmits a control information request for requesting notification of control information to the module which is not installed with the control information, via the inter-module communication processing section 62. In this way, the module control section 63 of the core module 20 recognizes what type of module is connected.

The control section 45 or control section 55 of the function module that has received the control information request at the core module communication processing section 48 or the core module communication processing section 58 then reads out control information from the storage section 46 or storage section 56. The control section 45 or the control section 55 then transmits the control information from the core module communication processing section 48 or the core module communication processing section 58 to the core module 20.

The download section 64 receives control information, and notifies the install section 65 of the control information. The install section 65 incorporates, that is installs, the control information to the module control section 63.

In this embodiment, it is also possible to have a structure where identification information for each function module is made up of overall identification information showing type of module, and individual identification information showing detailed functions of the module. For example, when a camera module such as the camera module 33 is connected, as well as first of all making identification information showing that it is a camera module overall identification information, it is possible to make information showing the number of images taken by the camera module and the type of input keys required individual identification information.

By receiving the individual identification information in addition to the overall identification information, it is possible for the core module 20 to carry out more detailed settings when changing its own function settings and installing control information from another function module. For example, when individual identification information showing the number of pictures taken by a camera mounted on the camera module 33 but not shown in the drawings has been received, it is possible change settings of the wireless communication processing section 28 inside the core module 20, equipped when attaching data, such as the picture taken by the camera, to an electronic e-mail message, and transmitting via a mobile communication network. Specifically, since attached data size generally becomes large when the number of pictures taken is large, if a size of data such as photographs predicted from the number of photographs taken by the camera becomes larger than a range limit for data size that can be transmitted by using the mobile communication network, it is possible to restrict data attachment at the time of e-mail transmission, and to change settings for memory management of a temporary saving region, not shown, inside the core module 20.

By performing the above described procedure, when it becomes possible for the core module 20 to control each of the function modules 31, 32, and 33, it is then possible for the core module to exchange control codes or data, and control each of the function modules in response to a user instruction, and to exhibit a function as the mobile communication terminal 10. Note that with the mobile communication terminal 10, when the operation section module 31 becomes controllable, the operation section function of the core module 20 is suspended. Also, when the display section module 32 becomes controllable, the display section function of the core module 20 is suspended.

As has been described above, the mobile communication terminal 10 of this embodiment is assembled by the user incorporating an arbitrary specified function module into the core module 20. When assembling the terminal, it is not possible for the core module 20 to know what type of function module is being incorporated in advance. However, it is possible to ascertain the type of function module that has been incorporated by using identification information notified to the connection module control means 63 of the core module 20 via the core module communication processing section 48, and 58 of the function module and the inter module communication processing section 62 of the core module 20. The core module 20 therefore implements the function of appropriately controlling a function module according to the user's preference.

Also, the construction of the mobile communication terminal 10 is such that the core module 20 and the function module may be attached or removed for connection. Therefore, in order to change to new functions or add functions, even if the existing function module is updated to a new function module, or a new function module is added, the only requirement is to purchase a new function module.

Also, when a function module exists, among function modules fitted to the core module 20, that the core module 20 can not control because it does not have control information in advance, such as a control program, the download section 64 downloads control information that is stored in the storage section (46 or 56) of that function module. Then, the install section 65 then installs the downloaded control information into the connection module control section 63. As a result, it is possible to automatically carry out control by using the core module 20, even if the function module can not be controlled by the core module 20 in an incorporation step.

It is further possible for the core module 20 to transmit information indicating its own function to each function module, and to transmit identification information for a function module that is already connected to a newly connected function module. In this case, the fact that a newly connected function module provides a plurality of types of control information is not a prerequisite, but it is possible for the newly connected function module to send optimum control information, depending on the function of the core module 20 and the type of each function module already connected to the core module 20, to the core module 20. In other words, a newly connected function module can cause installation of optimum control information for controlling itself into the core module 20.

Specifically, when there is a plurality of types of core module 20, due to version upgrades and so forth, the newly connected function module can send control information that is optimum for the core module 20 to the core module 20, based on version information etc. received from the core module 20. As a result, the core module 20 can install control information for a newly connected function module that is optimum for the core module 20.

Furthermore, in the case where a newly connected function module can be controlled by using key input, it is predicted that different key input receive processing will be necessary, depending on the following information, for example, whether an operation section module is connected or not, and further whether the type of operation section module connected is the operation section module 31 or the operation section module 31'. In such cases, as the result of the core module 20 sending this information to the function module, the newly connected function module can send to the core module 20 control information according to the type of operation section module currently connected to the core module. It is therefore possible for the core module to install control information for carrying out optimized function module control.

Furthermore, since the core module 20 is provided with a operation section for carrying out operation input, and a display section for carrying out display output, it is possible e-mail transceiving via mobile communication network in response to user instruction can achieve minimum functions as a mobile communication terminal with only the core module 20.

Figure 12:
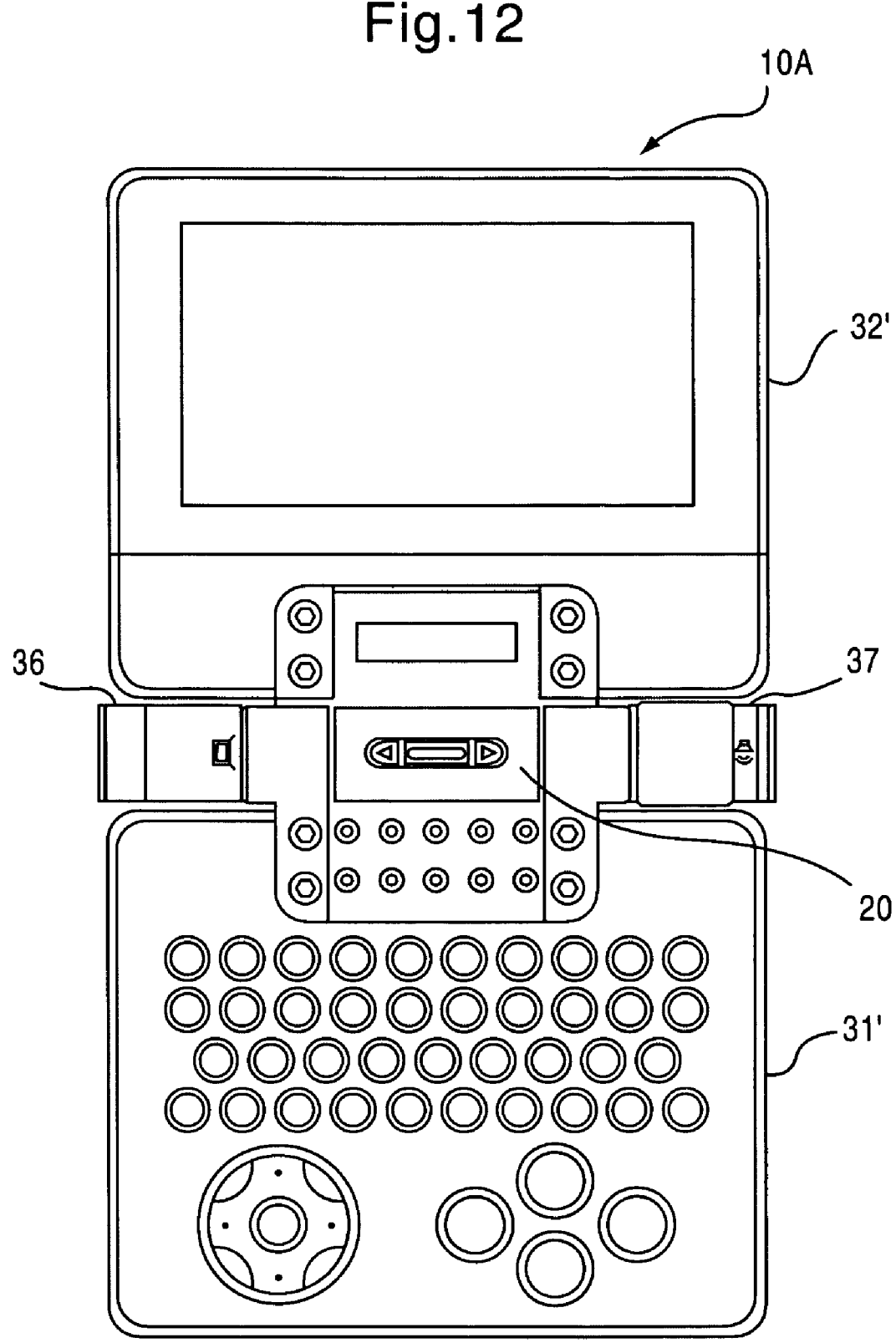
FIG. 12 is a drawing for describing the first embodiment.

Note that, with the above-described embodiment, description has been given for a mobile communication terminal 10 that is a mobile telephone having a camera function. On the other hand, the function modules shown in FIG. 5A-FIG. 6B and FIG. 8A-FIG. 9C may be arbitrarily built into the core module 20. For example, as shown in FIG. 12, the mobile communication terminal 10 used for entertainment may be constructed by incorporating an operation section module 31', display section module 32', television module 36 and speaker module 37 into the core module 20.

Figure 13A:
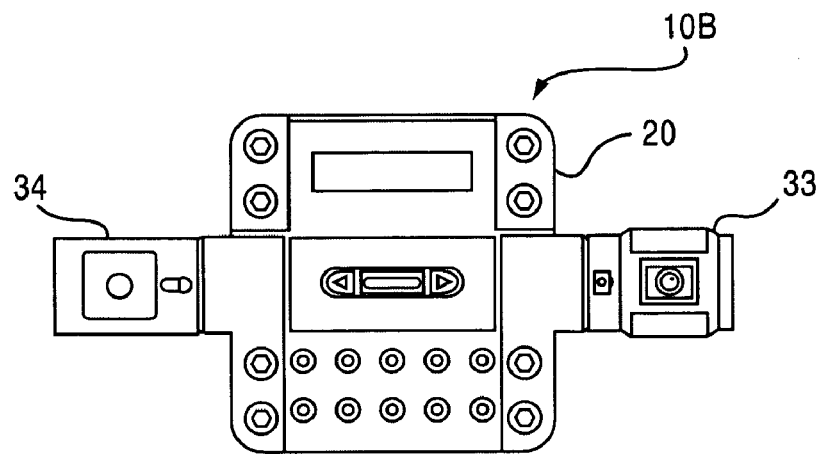
FIG. 13A is a drawing for describing the second embodiment.
Figure 13B:
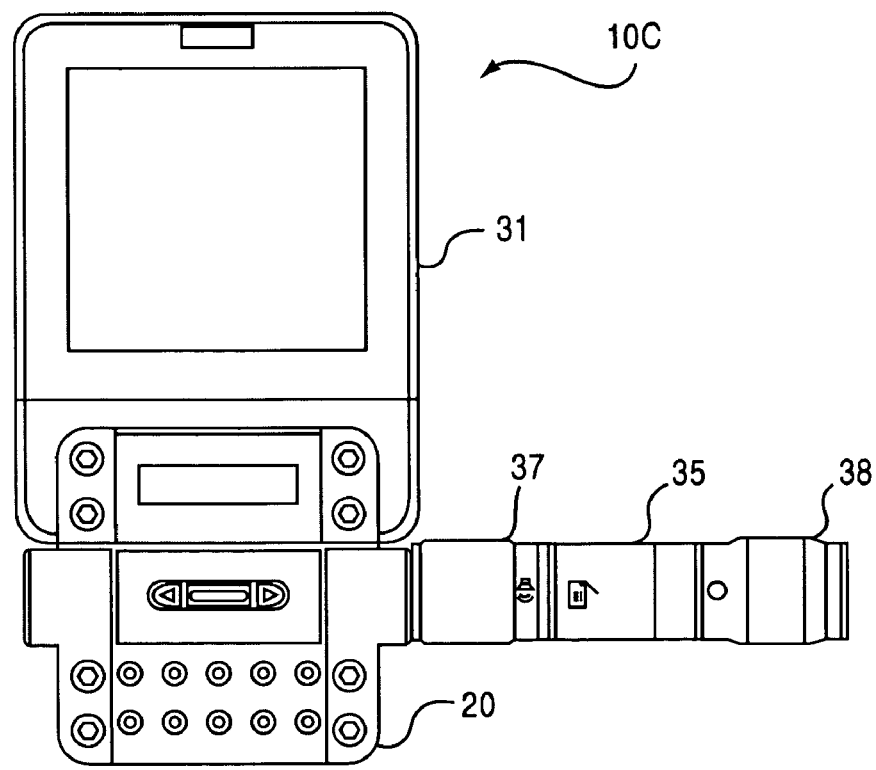
FIG. 13B is a drawing for describing the third embodiment.

Alternatively, as shown in FIG. 13A, it is possible to build a mobile communication terminal 10B that is compact and used for intelligence gathering by building the camera module 33 and flash lamp module 34 into the core module 20. As shown in FIG. 13B, it is also possible to build a mobile communication terminal 10C provided with functions that are ideal for when being used outdoors, by incorporating a speaker module 37, radio module 35 and GPS module 38 into the core module 20.

Also, as shown in FIG. 13A, it is possible for each of the function modules shown in FIG. 8A-FIG. 9C to be directly connected to the core module 20, or as shown in FIG. 13B, to be connected to the core module 20 via another function module.

In the above-described embodiment, the core module 20 is provided with an operation section and a display section. On the other hand, as the core module, it is not necessary to provide an operation section and display section, and to provide only one of them, or to have a structure with neither provided.

Furthermore, in the above described embodiment, the structure is such that a further function module can not be connected by means of the operation section module 31 and the display section module 32. However, it is also possible to provide a connection section on the operation section 31 and the display section module 32, and to connect another function module via these connection sections.

INDUSTRIAL APPLICABILITY

As has been described above, the mobile communication terminal of the present invention can be applied to assembly of a mobile communication terminal having various functions.

What is claimed is:

1. A communication terminal, having a core module and a plurality of function modules connected in an attachable and detachable manner, for performing wireless communication with base stations in a mobile communication network, each of the plurality of function modules comprising:
   core module communication processing means, for transceiving data, including transmission of own module identity information, to the core module, the core module comprising:
   wireless communication control means, for controlling wireless communication between the base station;
   a wireless transceive data processing section for carrying out transceive data processing by using the wireless communication;
   means for transmitting information indicating function of the core module, and the type of each function module already connected to the core module, to each function module;
   function module communication processing means, for transceiving data, including receipt of the module identity information, to the plurality of function modules; and
   connection module control means for controlling the function modules based on the identity information, wherein both the core module and the plurality of function modules are contained in the mobile communication terminal.

2. The mobile communication terminal of claim 1, wherein the function module further comprises control information storage means storing control information for self-control, and the core module further comprises:
   control information download means for downloading the new control information from control information storage means storing the new control information in the event that it is decided, from the module identity information, to be necessary to download new control information, and
   control information install means, for integrating the downloaded control information into the connection module control means.

3. The mobile communication terminal of claim 2, wherein the control information is a control program.

4. The communication terminal recited in claim 1, wherein the plurality of function modules comprises:
   an operation section module;
   a display module; and
   a camera module.

5. A core module for a mobile communication terminal that is capable of connecting a plurality of function modules in an attachable and detachable manner, comprising:
   wireless communication control means, for controlling wireless communication between base stations of a mobile communication network;
   a wireless transceive data processing section for carrying out transceive data processing by using the wireless communication;
   means for transmitting information indicating function of the core module, and a type of each function module already connected to the core module, to each function module;
   function module communication processing means, for transceiving data, including receipt of module identity information for identifying the function module, to and from the plurality of function modules; and
   connection module control means for controlling the plurality of function modules based on the module identity information,
   wherein both the core module and the plurality of function modules are contained in the mobile communication terminal.

6. The core module for a mobile communication terminal of claim 5, further comprising: control information download means for downloading the new control information from a function module storing the new control information in the event that it is decided from the module identity information to be necessary to download new control information, and control information install means, for integrating the control information, downloaded by using the control information download means, into the connection module control means.

7. The core module for a mobile communication terminal of claim 6, further comprising:
   operation input means for performing operation input; and
   display output means for performing display output.

8. The core module for a mobile communication terminal of claim 5, further comprising:
   operation input means for performing operation input; and
   display output means for performing display output.

9. The core module recited in claim 5, wherein the plurality of function modules comprises:
   an operation section module;
   a display module; and
   a camera module.

10. A plurality of function modules for a mobile communication terminal that is capable of connecting to a core module for a mobile communication terminal in an attachable and detachable manner, comprising:
- means for sending control information to the core module in dependence on function of the core module, and the type of each function module already connected to the core module, transmitted by the core module, and
- core module communication processing means for transceiving data, including transmission of own module identity information, to and from the core module for a mobile communication terminal,
- wherein both the core module and the plurality of function modules are contained in the mobile communication terminal.

11. The function module for a mobile communication terminal of claim 10, further provided with control information storage means for storing control information for use of the core module for a mobile communication terminal, wherein
- the control information is transmitted via the core module communication processing means to the core module for a mobile communication terminal, when it is necessary to download the control information from the core module for a mobile communication terminal.

12. The plurality of function modules recited in claim 10, wherein the plurality of function modules comprises:
- an operation section module;
- a display module; and
- a camera module.

* * * * *